(12) United States Patent
Lauri et al.

(10) Patent No.: US 8,895,634 B2
(45) Date of Patent: Nov. 25, 2014

(54) PROCESS FOR THE PRODUCTION OF EXPANDED PLASTIC MATERIALS, IN PARTICULAR PVC-BASED POLYMERIC FOAMS AND A FORMULATION OF A POLYMERIC BLEND FOR EFFECTING SAID PROCESS

(75) Inventors: Leone Lauri, Belluno (IT); Eva-Lotta Magdalena Petersson, Bastad (SE); Raffaela Bressan, Oderzo-Treviso (IT); Samia Mariam Hamed, Austin, TX (US)

(73) Assignee: Diab International AB, Laholm (SE)

( * ) Notice: Subject to any disclaimer, the term of this patent is extended or adjusted under 35 U.S.C. 154(b) by 34 days.

(21) Appl. No.: 13/703,327

(22) PCT Filed: Jun. 24, 2011

(86) PCT No.: PCT/EP2011/003186
§ 371 (c)(1),
(2), (4) Date: Dec. 10, 2012

(87) PCT Pub. No.: WO2012/007106
PCT Pub. Date: Jan. 19, 2012

(65) Prior Publication Data
US 2013/0267620 A1  Oct. 10, 2013

(30) Foreign Application Priority Data
Jul. 13, 2010 (IT) ............... MI2010A1279

(51) Int. Cl.
*C08J 9/00* (2006.01)
*B29C 44/34* (2006.01)
*C08J 9/10* (2006.01)
*B29K 27/06* (2006.01)

(52) U.S. Cl.
CPC ........... *C08J 9/0061* (2013.01); *B29C 44/3415* (2013.01); *C08J 9/10* (2013.01); *C08J 2327/06* (2013.01); *C08J 2475/00* (2013.01); *B29K 2027/06* (2013.01)
USPC .............................................. 521/94; 521/97

(58) Field of Classification Search
CPC ........ B29C 44/3415; C08J 9/0061; C08J 9/10
See application file for complete search history.

(56) References Cited

U.S. PATENT DOCUMENTS

| | | | |
|---|---|---|---|
| 3,836,110 A | 9/1974 | Osinsky et al. | |
| 5,859,082 A * | 1/1999 | Sufi | ............................... 521/136 |
| 2007/0128367 A1 | 6/2007 | Tabakovic et al. | |
| 2009/0145627 A1 | 6/2009 | Frigerio et al. | |
| 2010/0068487 A1 * | 3/2010 | Lauri et al. | .................... 428/218 |

FOREIGN PATENT DOCUMENTS

WO   WO 2007141647 A1 * 12/2007

* cited by examiner

Primary Examiner — Randy Gulakowski
Assistant Examiner — Christina Wales
(74) Attorney, Agent, or Firm — Themis Law (57) ABSTRACT

A perfected process for the production of expanded plastic materials, comprising a hot molding phase of a starting polymeric blend inside a mold, wherein the heating of said blend is effected by making the same a heat source, by triggering an exothermic reaction in its interior. With respect to the known art in the field, the process of the invention allows an improvement in the heating of the polymeric mass inside the mold, reducing the times necessary for effecting it and homogenizing the thermal values inside this mass.

4 Claims, 7 Drawing Sheets

PROCESS FOR THE PRODUCTION OF EXPANDED PLASTIC MATERIALS, IN PARTICULAR PVC-BASED POLYMERIC FOAMS AND A FORMULATION OF A POLYMERIC BLEND FOR EFFECTING SAID PROCESS

The present invention relates to a perfected process for the production of expanded plastic materials, in particular PVC-based polymeric foams. The invention is also extended to the formulation of a polymeric blend suitable for effecting this process.

The application field of the present invention is that of processes used for preparing expanded plastic materials, such as for example PVC-based foams which comprise the introduction, inside the heated mould, of the polymer blend, expanding agent, surfactant, isocyanates, catalysts and other products. This mould is then closed with its lid in a press, subjecting the blend to heating in this closed environment.

Traditionally, the heating necessary for the gelation of the PVC, the decomposition of the expanding agents and the cross-linking reaction is exclusively supplied from outside the blend, through the walls of the mould containing it.

The traditional heating solution described, however, has the disadvantage of the long heat transfer times, both through the walls of the mould, in the direction of the polymeric matrix, and also through the mass of the latter, by nature thermoinsulating.

A further drawback of the known art described herein is represented by the non-homogeneous distribution of the heat inside the polymeric mass to be heated, with a higher temperature in correspondence with the heated walls of the mould, and a lower temperature moving away from this position. Furthermore, due to this different heat distribution, the maintenance times of the polymeric blend at the reaction temperature are also different, depending on the distance of the points of this blend from the heating walls of the mould.

This often leads to a reaction product, i.e. an expanded polymer which, due to the thermal differences registered, has equally different physico-chemical characteristics inside the polymeric mass itself leaving the moulding treatment, diversities which are most relevant between the surface and most internal positions of the moulded polymeric mass.

In addition to the disadvantages described above, there are also those linked to the higher thermal requirement, as a result of the traditional heat transfer inside the polymeric mass, passing through the walls of the mould.

U.S. Pat. No. 3,836,110 relates to a mould for the manufacture of components of synthetic plastic material, in which the latent heat of the change in state from the solid state to the liquid state is used for the thermal reaction.

US 2009/145627 A1 discloses a process for manufacturing an electric cable by extruding on a conductor a blend of polyolefin, cross-linking agent and exothermic foaming agent.

US 2007/128367 A1 discloses a foaming process comprising applying to a substrate a composition comprising a polyurethane resin, a surfactant and a blowing agent, expanding by heating and cooling.

US 2010/068487 A1 discloses a foamable blend comprising PVC, anhydride, chemical blowing agents, isocyanates and catalyst.

The main objective of the present invention is to provide a new process for the production of expanded plastic materials which, with respect to the known methods in the field, is capable of significantly reducing the time necessary for heating the polymeric blend inside the mould.

A further objective of the invention is to heat the polymeric blend inside the mould more homogeneously with respect to the known art, with reduced times and uniform temperatures inside the overall polymeric mass.

Another objective of the invention is to provide a process of the type specified above and a polymeric blend, suitable for producing an expanded plastic material having homogeneous and improved physico-chemical properties with respect to those obtained with traditional methods.

These and other objectives are achieved with the process and with the formulation of a polymer blend of claims 1 and 4 respectively. Preferred embodiments of the invention are indicated in the remaining claims.

With respect to the known art in the field, the process and formulation of the invention allow an improved heating of the polymeric mass in the mould, reducing the times necessary for effecting it by approximately 30%, and homogenizing the thermal values inside this mass. In particular, this reduction is equal to 50-60 sec. of heating time for each millimetre of depth of the mould of the known art and 35-40 sec. of heating time for each millimetre of depth of the mould according to the invention.

A further advantage of the invention is represented by the improved and more homogeneous thermo-mechanical properties of the expanded polymer obtained, with respect to the known art in the field.

These and other objectives, advantages and characteristics are evident from the following description of a preferred embodiment of the process of the invention shown, for illustrative and non-limiting purposes, in the figures of the enclosed drawings.

In these.

Figure 1:
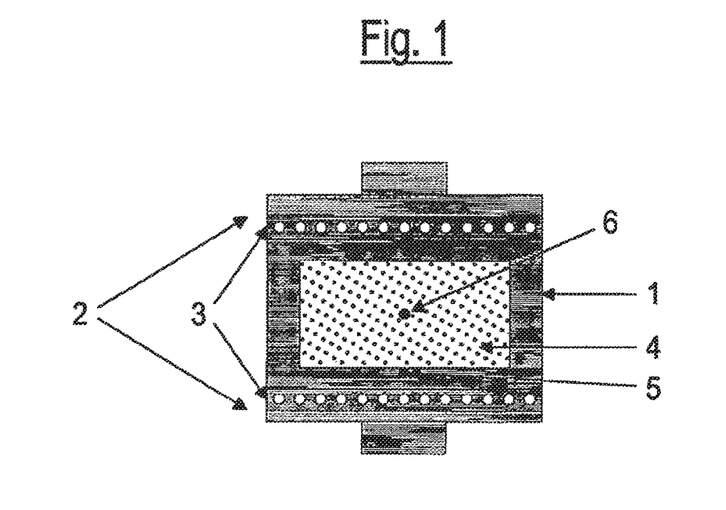
FIG. 1 illustrates a schematic view of an example of a mould for effecting the process of the invention.

The mould illustrated in FIG. 1, indicated as a whole with the reference number 1, comprises two plates 2 provided with an internal tubing 3 for the heating and cooling of the polymeric blend. Point 5 is that for detecting the external temperature, point 6, on the other hand, reveals the temperature of the nucleus of the blend 4.

Figure 2:
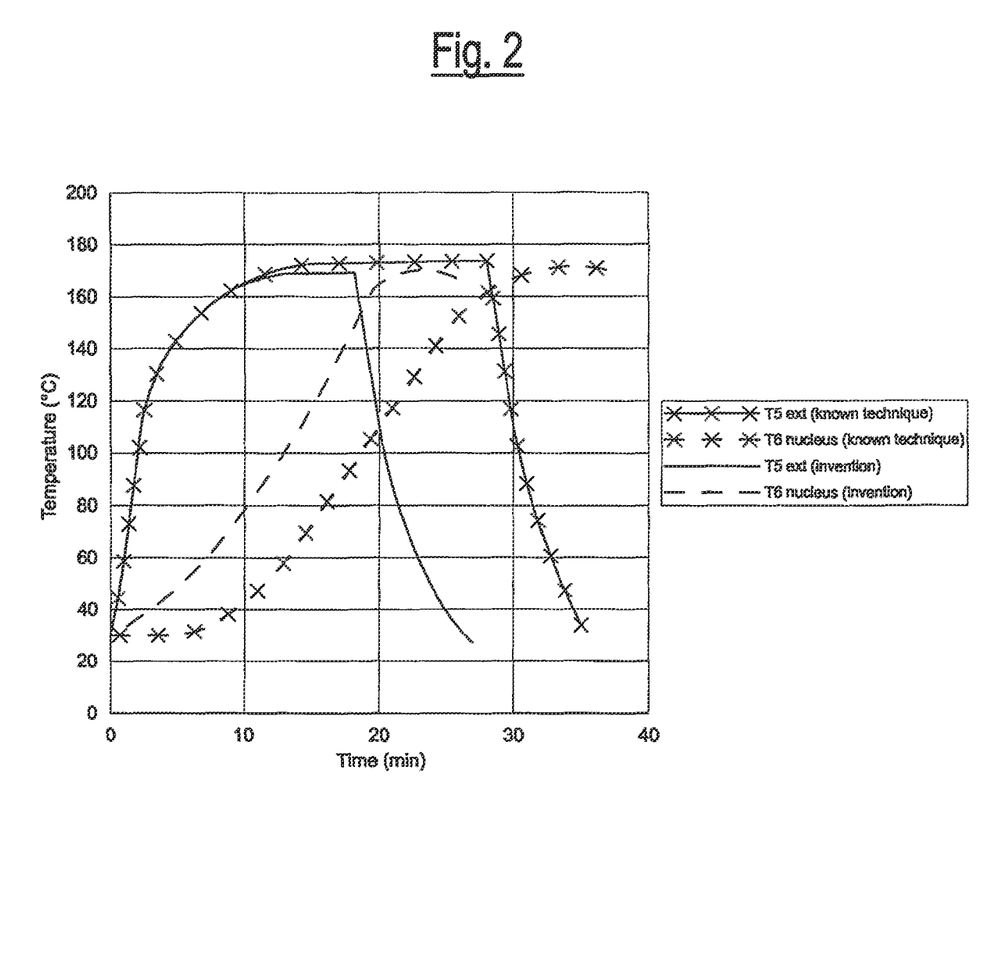
FIG. 2 illustrates the comparative curves of the temperature profiles, on the walls of the mould of FIG. 1 and nucleus of the polymeric blend treated, respectively, for a known process and for that according to the invention.

The thermal detections of the process effected with the use of the mould 1 are indicated in FIG. 2, according to the known art and according to the invention, respectively. In particular, after the first 10 minutes approximately of a traditional heating process of the starting polymeric mass, in which the most external parts of the latter are heated to the desired temperature of about 175° C., a further 18 minutes approximately are required for bringing the innermost nucleus of said polymeric mass to the same temperature. Starting from this point (about 28 minutes) the cooling initiates, which, on the outermost parts of the polymer, leads to an immediate temperature drop whereas, on the innermost parts, there is a delay of about 7 minutes.

The invention proposes to reduce the temperature range necessary for transferring, inside the nucleus of the polymeric mass 4, the heating temperature necessary for the gelation reactions of the PVC and formation and incorporation of the gas phase generated by the decomposition of the expanding agents present in the starting mass.

The invention also aims at reducing the initial temperature for triggering the reactions, bringing it to that which is strictly necessary for their start-up, no longer having to take into account the difficulties relating to the heat transfer towards the interior of the polymeric mass.

The invention consists in using the external heat, supplied by the heating plates 2 of the mould 1, only for triggering an exothermic reaction which takes place inside the polymeric mass, making the mass itself a heat source instead of an insulating material, thus promoting the heat transfer towards the inside of said mass. The exothermic reaction must take place within the desired temperature range, which depends on the melting point of the polymers introduced into the starting blend. In this specific case, the exothermic reaction produces the heat/energy at a temperature of 155-160° C. necessary for the gelation of the PVC, allowing a reduction in the external energy demand, decreasing the heat gradient and improving the uniformity of the composition and microcellular structure, with a consequent improvement in the thermo-mechanical properties of the end-product obtained.

As can be seen from the curves relating to the process of the invention, in fact, as indicated in FIG. 2, the process temperature is brought to the required value of 155-167° C. (and no longer 170-175° C.) in shorter times (less than 10 minutes approximately outside the polymeric mass in the mould (continuous line curve).

Figure 3:
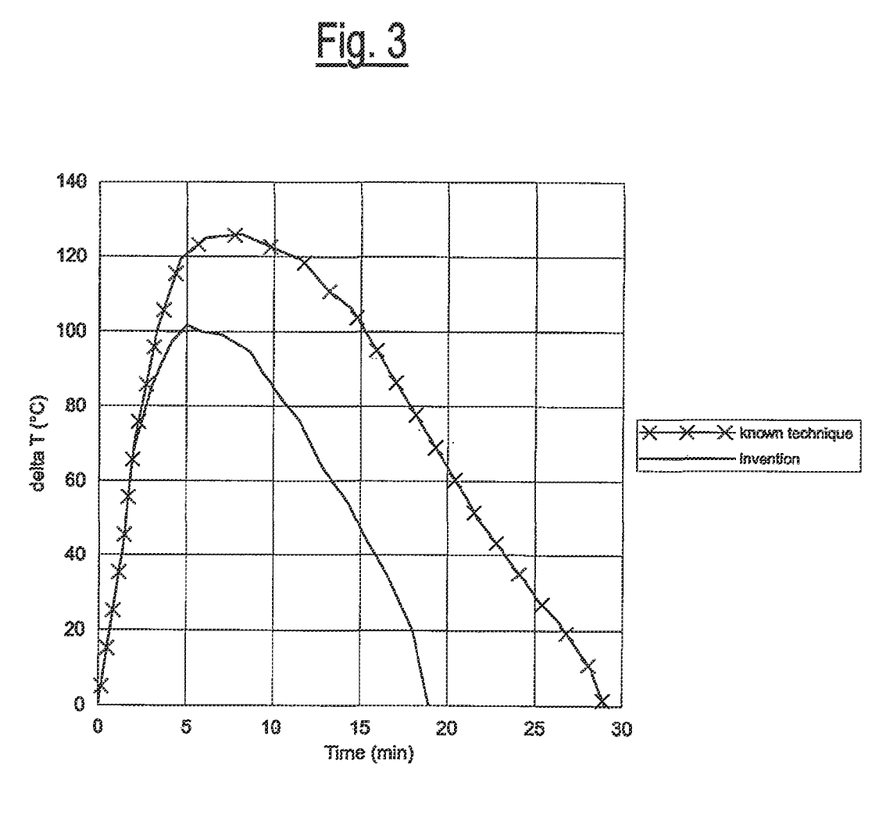
FIG. 3 illustrates a comparative example, of the same type as FIG. 2, relating to the trend of the thermal jump between the wall of the mould and the nucleus of the blend during the heating.

Thanks to the invention and as can be observed in the graph of FIG. 3, the thermal jump between the outermost parts of the polymer in the mould and the parts closer to the nucleus of the polymeric mass has decreased in the process according to the invention, with evident advantages with respect to the quality of the end-product and energy saving.

The experimental results, as indicated in the graph of FIG. 3 mentioned above, refer in particular to a polymeric blend consisting of:
PVC 35-50%
Anhydride 1-20%
Isocyanate 20-50%
Expanding agents 0.5-7%
Surfactant 0.08-0.8%
according to the known art and with the addition of catalyst 0.1-0.2% by weight in the specific case of the invention, respectively.

The same results are summarized in the following table, wherein ΔT indicates the difference in temperature between the external temperature T5 and internal temperature T6 of the polymeric mass in the mould 1:

| Time min. | Known art ΔT (° C.) | Invention ΔT (° C.) |
|---|---|---|
| 1 | 17 | 17 |
| 2 | 23 | 23 |
| 3 | 68 | 68 |
| 4 | 115 | 98 |
| 5 | 120 | 100 |
| 8 | 130 | 90 |
| 18 | 80 | 20 |

Figure 4:
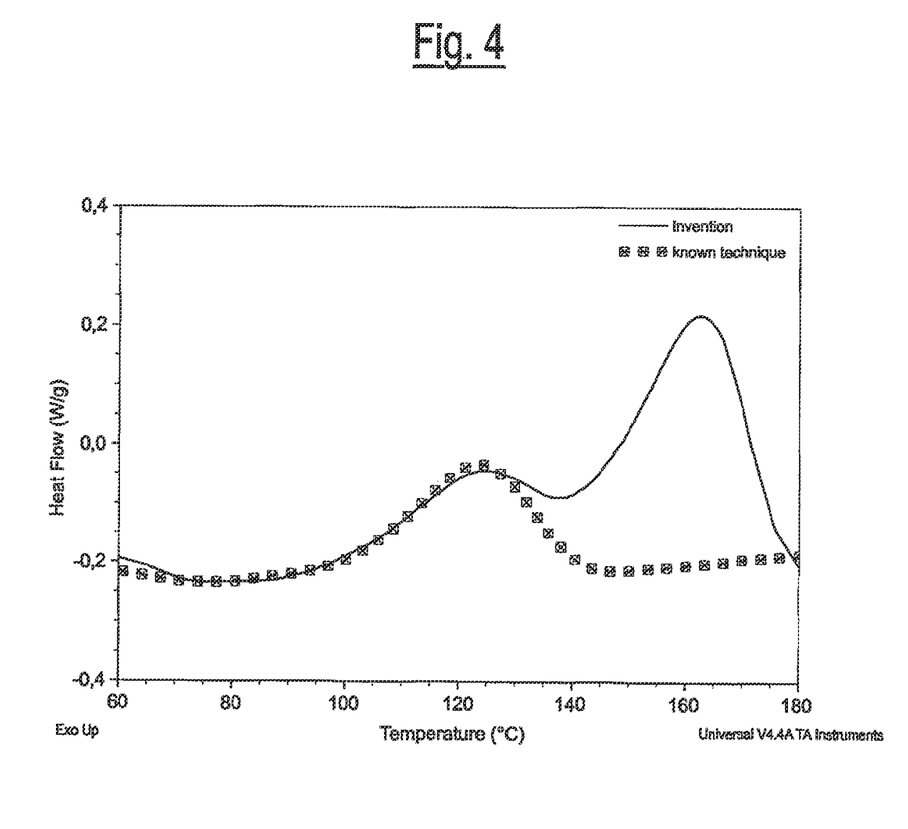
FIG. 4 illustrates the result of a DSC analysis effected on the initial polymer blend according to the known art and according to the invention.

The Dynamic Scanning calorimetry (DSC) test of FIG. 4 shows:

with the curve with asterisks, the exothermy at 120° C. relating to the gas formation reaction;

with the continuous curve, the presence of a further exothermy reaction between 145° C. and 170° C. approximately, which is that which provides the heat necessary for the process reactions of the invention.

It should be noted therefore that the reactions taking place inside the polymeric blend 4 in the mould 1 are gelation or melting of the polymeric matrix and the generation of the gas phase, with an incorporation of this gas phase within a microcellular structure, thus giving rise to the formation of an expandable embryo, the disclosure offered by the invention is to create an exothermic reaction inside said polymeric blend which is situated in the mould 1, which is sufficient for bringing this same blend to the melting point of the polymer or polymers of which it is composed. In the case of PVC, this temperature is about 170° C. and, according to the invention, this is reached through the suitable activation of the following trimerization reaction of isocyanate to isocyanurate:

This reaction is in fact strongly exothermic, in particular when activated, according to the invention, inside the polymeric mass in the range of temperatures corresponding to the gelation of the PVC. Furthermore, in the specific fields to which the present invention relates, the trimerization reaction of the isocyanate must be effected in the presence of a catalyst based on quaternary ammonium carboxylate, preferably $((CH_3)_3N-CH_2-(CH_3)CH(OH))^*(HCOO)^-$, added in a quantity of 0.1-0.2% by weight inside the starting polymeric blend.

In particular, thanks to the use of these substances which activate the trimerization reaction, the glass transition temperature of the expanded products of the invention is higher than those obtained according to the known art.

Figure 5:
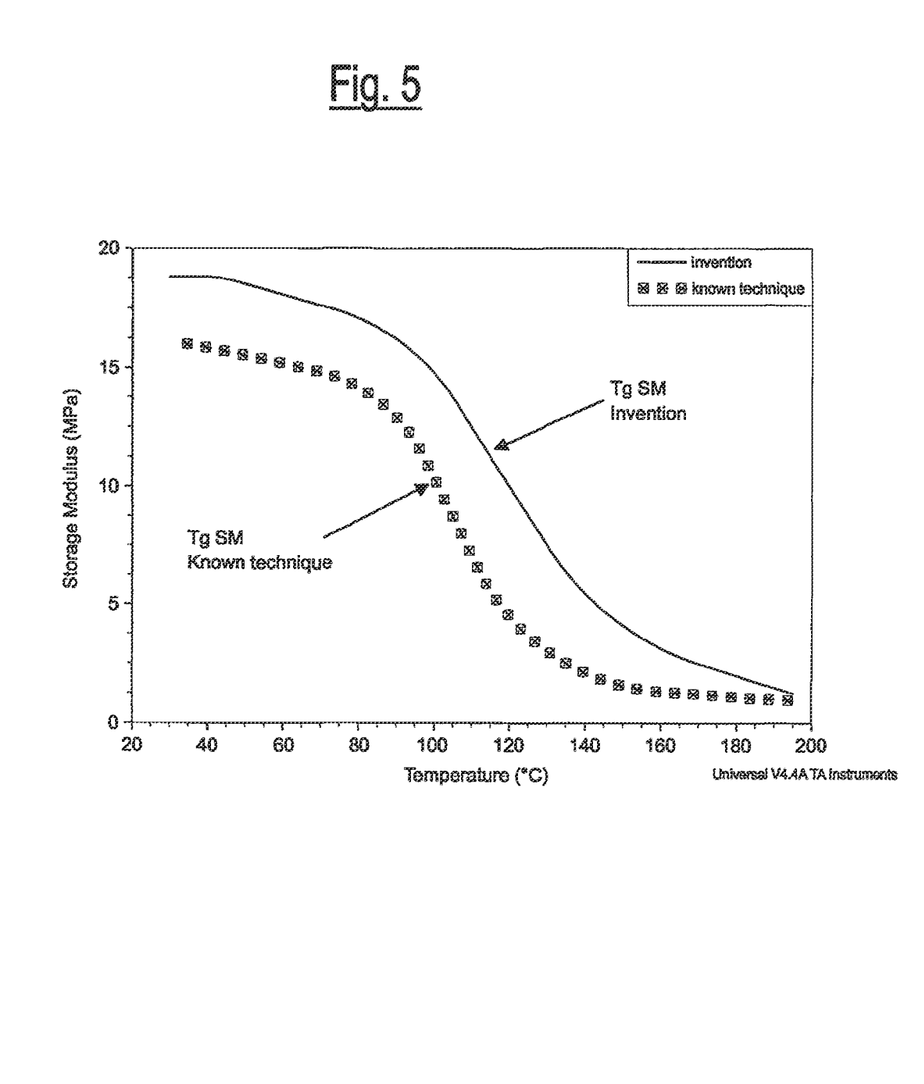
FIGS. 5 to 7 illustrate the comparative results of DMA analyses effected on expanded polymers obtained according to the invention and according to the known art.
Figure 6:
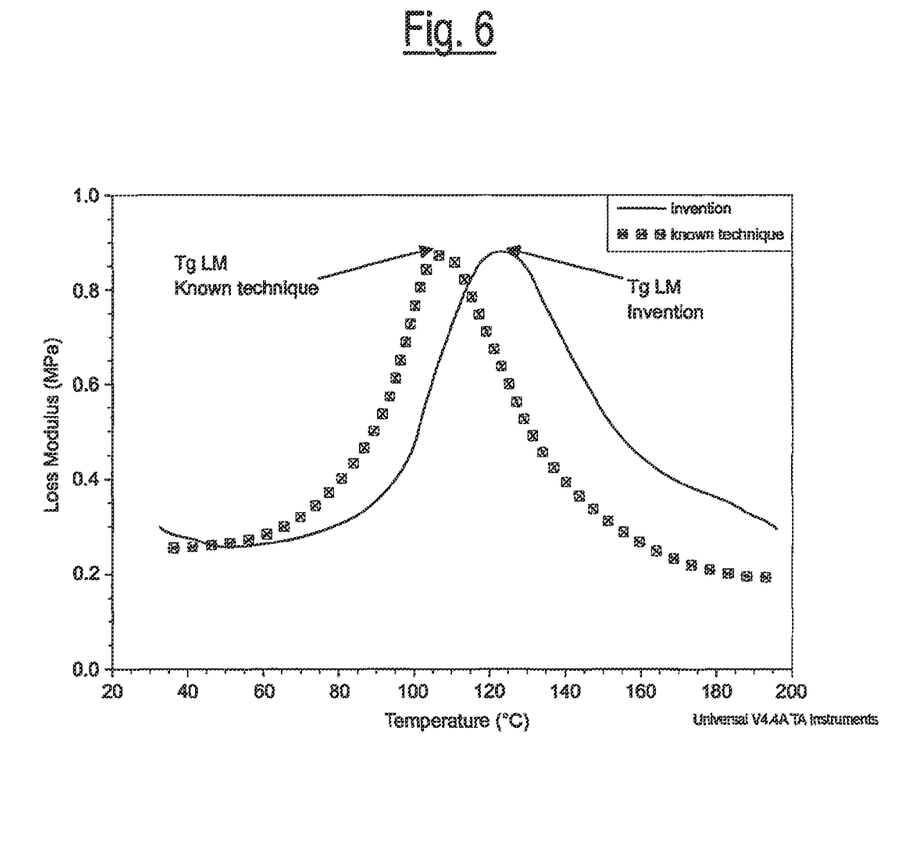
Figure 7:
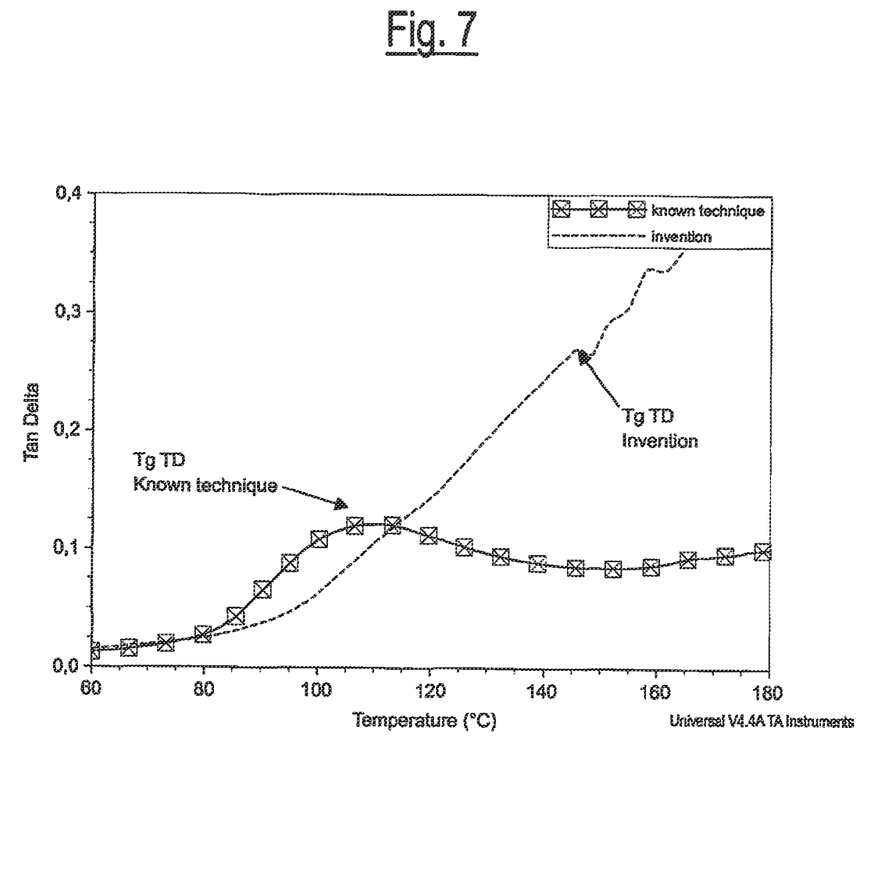

Using, for example, a starting polymeric blend composed of (weight %):

| | |
|---|---|
| PVC | 35-60% |
| Anhydride | 1-20% |
| Isocyanate | 20-50% |
| Expanding agents | 0.5-7% |
| Surfactant | 0.8-0.8% | this was compared, in the following table, with an analogous formulation, to which 0.1-0.2% of quaternary ammonium carboxylate was added as trimerization catalyst of the isocyanate. The table relates this comparison to the Tg Storage Modulus (see graph of FIG. 5), Loss Modulus (graph of FIG. 6) and TanDelta (graph of FIG. 7) values, measured with the Dynamic Mechanical Analysis (DMA) test:

TABLE 1

| DMA thermo-mechanical properties of the expanded polymer | | |
|---|---|---|
| | KNOWN ART | INVENTION |
| Tg Storage Modulus | 101° C. | 116° C. |
| Tg Loss Modulus | 107° C. | 122° C. |
| Tg Tan-Delta | 125° C. | 142° C. |

From the above table, the improved thermo-mechanical properties of the expanded polymer of the invention, in the form of a polymeric foam, can be observed, with respect to that of the known art.

With the process of the invention, it is possible to produce an expanded polymeric material consisting of IPN (Inter Penetrating Network) polymeric foam based on polyamide-polimide-polyvinylchloride-polyisocyanurate-polyurea.

Other expanded polymers to which the invention can be applied are polyamide, polystyrene and other thermoplastic polymers, in the presence of exothermic reactions suitable for providing the necessary melting points of the same polymers.

The invention claimed is:

1. An expanded plastic material, comprising:
   an IPN polymeric foam consisting of polyamide-polyimide-polyvinyl chloride-polyisocyanurate-polyurea,
   wherein said expanded plastic material is manufactured from a polymeric blend comprising:
   a polymeric matrix, isocyanate, anhydride and catalyst adapted for triggering in an interior of said blend an exothermic reaction represented by the following trimerization reaction from isocyanate to isocyanurate:
   said reaction being triggered by supplying heat from outside of a heated mold in which said polymeric blend is produced.

2. The blend according to claim 1 wherein said blend includes (weight %):
   PVC=35-60%
   Anhydride=1-20%
   Isocyanate=20-50%
   Expanding agents=0.5-7%
   Surfactant=0.08-0.8%
   Trimerization catalyst of isocyanate=0.1-0.2%.

3. The material according to claim 1, wherein said material is a polymeric foam having:

| | |
|---|---|
| Tg Storage Modulus | 116° C. |
| Tg Loss Modulus | 122° C. |
| Tg Tan-Delta | 142° C. |

4. The expanded plastic material according to claim 1, wherein said material is manufactured into a product.

* * * * *